United States Patent [19]

Langley

[11] Patent Number: 4,833,010
[45] Date of Patent: May 23, 1989

[54] COMPOSITE CHEMICAL BARRIER FABRIC

[75] Inventor: John D. Langley, Guntersville, Ala.

[73] Assignee: Kappler Safety Group, Guntersville, Ala.

[21] Appl. No.: 189,202

[22] Filed: May 2, 1988

[51] Int. Cl.⁴ .................. A62B 17/00; A62D 5/00; B32B 27/12

[52] U.S. Cl. .................. 428/287; 2/2; 2/243 A; 428/311.1; 428/311.5; 428/317.3; 428/319.7; 428/319.9; 428/475.8; 428/476.1; 428/518

[58] Field of Search ............ 2/2, 243; 426/127; 428/287, 311.1, 311.5, 317.3, 319.7, 319.9, 475.8, 476.1

[56] References Cited

U.S. PATENT DOCUMENTS

| | | | |
|---|---|---|---|
| 4,234,647 | 11/1980 | Murphy et al. | 428/319.7 |
| 4,284,674 | 8/1981 | Sheptak | 428/334 |
| 4,355,721 | 10/1982 | Knott et al. | 428/475.8 |
| 4,501,798 | 2/1985 | Koschak et al. | 428/476.1 |
| 4,640,852 | 2/1987 | Ossign | 428/476.1 |
| 4,746,562 | 5/1988 | Fant | 428/476.1 |
| 4,753,840 | 6/1988 | Van Gompel | 428/287 |
| 4,755,419 | 7/1988 | Shah | 428/474.6 |

Primary Examiner—James C. Cannon
Attorney, Agent, or Firm—C. A. Phillips

[57] ABSTRACT

A multilayer chemical barrier fabric is made up of a base sheet of nonwoven polypropylene laminated on one side to a multilayer film sheet having a film of ethylene vinyl alcohol sandwiched between films of nylon with a surface film if linear low-density polyethylene bonded to the outer film of nylon and laminated on the other side to a multilayer film sheet having a central film of polyvinylidine chloride, an inner film of ethylene vinyl acetate, and an outer film of low-density polyethylene. Fabrics having this structure show resistance to breakthrough within eight hours for all fifteen chemicals listed on the ASTM F1001 chemical test battery. A composite fabric having the above structure, but omitting the multilayer film that contains polyvinylidine chloride, is also disclosed.

6 Claims, 1 Drawing Sheet

COMPOSITE CHEMICAL BARRIER FABRIC

FIELD OF THE INVENTION

This invention relates generally to protective fabrics and more particularly to composite fabrics that provide a barrier to permeation by chemicals.

BACKGROUND OF THE INVENTION

One of the requirements for obtaining safe working conditions for employees in various industries or emergency service organizations is the provision of protective garments that prevent toxic chemicals or other contaminants from coming into contact with the worker's body. The need for such protection has been emphasized in recent years by enactment of local, state, and federal laws and/or regulations requiring the use of protective garments under many circumstances.

The effectiveness of materials for protective garments and other chemical barrier application is conventionally determined by permeation tests which measure the time required for a given chemical to permeate through the material on a molecular level. A standarized test procedure for determining effectiveness against a wide variety of chemicals has been established. This procedure is designated by the American Society for Testing and Materials as the ASTM F739, "Test Method for Resistance of Protective Clothing Materials to Permeation by Liquds and Gases," and selection of chemicals for testing is governed by ASTM F1001 "Standard Guide for Selection of Chemicals to Evaluate Protective Clothing Materials." The test provides for exposure of materials in a standard two-part permeation cell to fifteen different liquid chemicals, representative of fifteen classes of compounds, until "breakthrough" occurs, this being defined as the time at which the smallest detectable amount, generally one part per million, of resulting gas molecules are measured on the opposite side of a material sample.

Various types of materials have been used for chemical barrier applications including polymeric films, rubber-based sheet material, and multilayer composites made by bonding of film layers to one another or to fabric. While the available materials may provide an effective barrier to some types of chemicals, none are known to prevent permeation of all of the fifteen included in the above-mentioned test procedure. One polymeric film material, for example, is effective for primary alcohols and inorganic mineral acids, but not for saturated hydrocarbons and chlorinated olefins. Another material is effective for many types of chemicals, but not for organic sulfur compounds or heterocyclic ethers. Such gaps in coverage require careful selection of the protective material for its end use environment. In many instances, the specific chemical components in a contaminating mixture, as may be present in waste dumps and hazardous response situations, may be unknown so that selection for a particular contaminant is not feasible. A need thus exists for a barrier material effective for a wide range of chemicals as exemplified by those included in the referenced test procedure.

In addition to providing an effective chemical barrier, materials for protective garments should meet practical requirements for amenability to fabrication by existing methods such as heat bonding of seams, as well as for sufficient physical strength to prevent tearing and the resulting loss of protection.

SUMMARY OF THE INVENTION

The present invention is directed to a composite multilayer chemical barrier fabric having a plurality of sheets of material laminated to one another, including a base sheet comprising a fabric material that provides separation and open space between sheets laminated thereto and at least one outer sheet of a multilayer film made up of a central layer of ethylene vinyl alcohol sandwiched between layers of nylon and, on the exposed face of the outer sheet, a heat-sealable polyethylene material. Layers of a suitable adhesive are disposed between the laminated sheets as required. For maximum effectiveness, the composite includes on the face of the base fabric opposite the sheet containing ethylene vinyl alcohol a multilayer sheet having a base film of polyvinylidine chloride with an ethylene vinyl acetate film on its inner face and a heat-sealable polyethylene film on its outer face.

Composite fabrics embodying the invention provide protection against permeation by a wide variety of chemicals. An embodiment that includes multilayer films on both faces of the polypropylene fabric is very effective, providing protection against breakthroughs for at least eight hours for all fifteen types of chemicals included in the referenced test procedure. Although the other embodiment, which includes a multilayer film on only one face of the base fabric, is less effective, it nonetheless provides effective protection against many types of the chemicals against which protective fabrics are tested. These fabrics show favorable strength characteristics and durability, and they may be readily fabricated into garments by heat-sealing methods.

The outstanding performance of composite fabrics embodying the invention is believed attributable to a synergistic effect obtained by joining two sheets of barrier material with a base sheet between them, the base sheet having internal open spaces. This combination produces a synergistic effect in that much less permeation occurs than would if the two sheets of barrier material were joined directly to one another.

It is, therefore, an object of this invention to provide a composite multilayer fabric material that provides an effective barrier to permeation by a wide variety of chemicals.

Another object is to provide such a fabric material that is amenable to fabrication into protective garments by heat sealing of seams.

Another object is to provide such a fabric material that has favorable strength and durability.

Other objects and advantages of the invention will be apparent in the following detailed description and claims appended hereto.

DESCRIPTION OF THE PREFERRED EMBODIMENT

Figure 1:
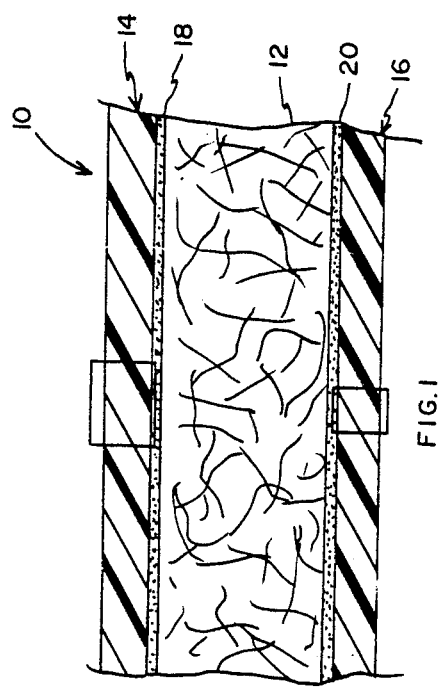
FIG. 1 is an enlarged cross-sectional view of a multilayer composite fabric material emboding the invention and including multilayer sheets laminated to both faces of the base fabric sheet.

Referring to FIG. 1, a multilayer composite fabric material 10 is shown. The composite includes a base or middle sheet 12 of nonwoven polypropylene fabric having a first multilayer sheet 14 laminated to one face and a second multilayer sheet 16 laminated to its opposite face with layers 18, 20 of adhesive disposed between faces of the base sheet and the sheets laminated thereto.

Nonwoven polypropylene available from Phillips Fibers Corporation under the trademark "Duon" may be used for the base fabric 12. A 2.3-ounce fabric designated as L17307 is preferred. Other fabrics which are bondable to the film sheets of the composite and which provide voids between the film sheets may be used, for example, fabrics of other polymeric materials such as polyesters.

Figure 3:
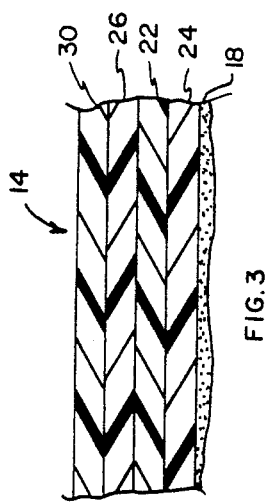
FIG. 3 is an enlarged cross-sectional view showing the structure of the top multilayer sheet of FIG. 1.

As shown in FIG. 3, the multilayered film sheet 14 which is laminated to one face of the base sheet includes a film 22 of ethylene vinyl alcohol sandwiched between films 24, 26 of nylon and bonded to an outer film 30 of linear low-density polyethylene. A suitable film sheet material with such construction and having a thickness of three mils is available from Print Pack, Inc., under the designation Omniflex TM, No. C44–442.

Figure 2:
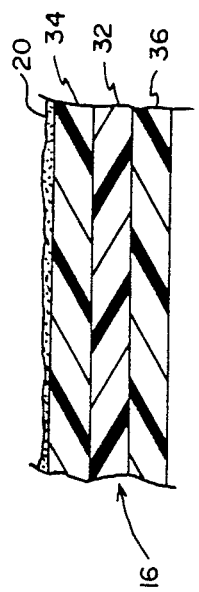
FIG. 2 is an enlarged cross-sectional view showing the structure of the bottom multilayer sheet of FIG. 1.

FIG. 2 shows the structure of the film sheet 16 bonded to the other face of the base sheet. Film sheet 16 has a central layer 32 of polyvinylidine chloride with an ethylene vinyl acetate layer 34 on the inner face of the composite and a low-density polyethylene film 36 on the outside. Such film sheet material is manufactured and sold by Dow Chemical Company under the trademark Saranex 23P TM.

As shown in FIG. 1, an adhesive film 18 is provided for lamination of base sheet 12 to the ethylene vinyl alcohol containing sheet 14. The adhesive is selected for its compatability with unwoven polypropylene and with the nylon film to which the ethylene vinyl alcohol film is bonded. A blended mixture of EMA (ethylene methyl acrylic) and low-density polyethylene may be used for this purpose. Preferably, the adhesive is applied to a thickness of 1 to 1.25 mils. Similarly, an adhesive layer 20, which may be the same adhesive composition, is provided between the polypropylene base sheet 12 and polyvinylidine chloride containing sheet 16.

To provide the desired color to the fabric, pigments may be incorporated in the adhesive mixture with different colored pigments being preferred for the two films. For example, film 18 may include blue pigment, while film 20 includes a white pigment.

Fabrics embodying the invention may be prepared by means of extruding the adhesive layer between the base fabric and each film sheet and immediately cooling the composite with a chill roller.

Samples of a fabric having the structure described above were subjected to independent laboratory testing by exposure to the fifteen chemicals listed below using the ASTM F739 method, the fifteen chemicals constituting those included in the ASTM F1001 chemical test battery. The chemicals tested and the class of compounds represented by each were as follows:
acetone, ketone;
acetonitrile, nitrile;
carbon disulfide, organic sulfur;
dichloromethane, chlorinaated paraffin;
diethylamine, amine;
dimethyl-formamide, amide;
ethyl acetate, ester;
n-hexane, saturated hydrocarbon
methanol, primary alcohol;
nitrobenzene, nitro compound;
sodium hydroxide 50%, inorganic base;
sulfuric acid 93%, inorganic mineral acid:
tetrachloroethylene, chlorinated olefin;
tetrahydrofuran, heterocyclic & ether; and
toluene, aromatic hydrocarbon.

In each case, no breakthrough occurred for any of these chemicals for an eight-hour test period. These results are in sharp contrast to results obtained for commercially available protective fabrics. None of the commercially available fabrics known to applicant prevent breakthrough of all fifteen chemicals for eight hours, and a majority of such products shown chemical breakthrough in less than eight hours for over half of these chemicals.

Figure 4:
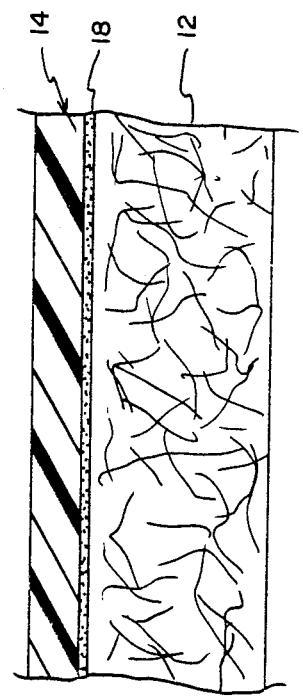
FIG. 4 is an enlarged cross-sectional view of an embodiment including a multilayer sheet laminated to only one face of the base fabric sheet.

An alternative embodiment as shown in FIG. 4 includes a base sheet 12 of nonwoven polypropylene and a multilayer film 14 containing ethylene vinyl alcohol as well as an adhesive film 18 as shown in the preferred embodiment, but it does not include a third sheet on the opposite face of the base sheet. Fabric having the structure in FIG. 4, when subjected to pre-screening testing, showed no breakthrough within seven hours for approximately eighty percent of the chemicals listed above. Thus, its performance is comparable to or better than existing products, and it could be employed for less severe environments.

It may be seen from the above that the applicant has provided a major improvement in chemical barrier fabrics by obtaining fabrics resistant to permeation by a wide range of chemical compounds representing diverse classes of chemicals. In addition, the fabric may be readily made up into garments using heat-sealed seams, and such garments show favorable durability and economy.

I claim:
1. A composite multilayer fabric comprising:
a base sheet of fabric having internal open spaces, a first multilayer film sheet laminated to one face thereof and a second multilayer film sheet laminated to its opposite face;
said first multilayer film sheet comprising a film of ethylene vinyl alcohol, a film layer of nylon laminated to each face thereof, and an outer film of heat-sealable polyethylene; and
said second multilayer film sheet comprising a film of polyvinylidine chloride having a film of ethylene vinyl acetate laminated to the inner face thereof and a film of heat-sealable polyethylene laminated to its outer face.
2. The fabric of claim 1 wherein said base sheet is nonwoven polypropylene fabric.
3. The fabric of claim 2 including a first film of adhesive disposed between said base sheet material and said first sheet and a second adhesive film disposed between said base sheet and said second sheet.
4. The fabric of claim 3 wherein the outer film of polyethylene of said first sheet is linear low-density polyethylene, and the outer film of polyethylene of said second sheet is low-density polyethylene.
5. The fabric of claim 5 including a pigment in at least one of said adhesive layers.
6. The fabric of claim 2 wherein the weight of said nonwoven polypropylene is 2.3 ounces.

* * * * *